United States Patent
Weber et al.

[11] Patent Number: 5,925,158
[45] Date of Patent: *Jul. 20, 1999

[54] GAS RECYCLE FOR FLOAT GLASS SYSTEM

[75] Inventors: Joseph Alfred Weber, Cheektowaga; Theodore Fringelin Fisher, Amherst; Dante Patrick Bonaquist, Grand Island, all of N.Y.

[73] Assignee: Praxair Technology, Inc., Danbury, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/994,483

[22] Filed: Dec. 19, 1997

[51] Int. Cl.$^6$ ............................................... C03B 5/16
[52] U.S. Cl. .......................... 65/27; 65/29.13; 65/32.1; 65/99.2; 65/99.4; 65/157; 95/96; 95/117; 95/135; 95/136; 95/211
[58] Field of Search .................... 65/27, 29.13, 32.1, 65/99.2, 99.4, 157; 95/96, 117, 135, 136, 211

[56] References Cited

U.S. PATENT DOCUMENTS

| | | |
|---|---|---|
| 2,198,745 | 4/1940 | Smith . |
| 3,356,476 | 12/1967 | Gulotta ........................................ 65/27 |
| 3,630,701 | 12/1971 | Javaux et al. ............................... 65/27 |
| 3,864,460 | 2/1975 | Connell ..................................... 423/574 |
| 4,027,002 | 5/1977 | Powlesland et al. ..................... 423/573 |
| 4,406,682 | 9/1983 | Ernsberger .............................. 65/99.4 |
| 4,711,645 | 12/1987 | Kumar ......................................... 55/26 |
| 4,770,678 | 9/1988 | Haslett, Jr. ............................... 96/117 |
| 4,919,914 | 4/1990 | Smith et al. .......................... 423/576.2 |
| 5,256,384 | 10/1993 | Rolke et al. ............................ 423/220 |

FOREIGN PATENT DOCUMENTS

| | | | |
|---|---|---|---|
| 1528986 | 6/1968 | France ....................................... 65/99.4 |
| 4-187207 | 7/1992 | Japan ......................................... 95/96 |
| 4-187208 | 7/1992 | Japan ......................................... 95/96 |

OTHER PUBLICATIONS

Perry's Chemical Engineers' Handbook, 6th Edition, pp. 20–94, 26–47–26–48, 1984.

*Primary Examiner*—Peter Chin
*Assistant Examiner*—Michael P. Colaianni
*Attorney, Agent, or Firm*—Stanley Ktorides

[57] ABSTRACT

A method for cleaning and recycling protective atmosphere for a float glass facility wherein contaminated protective atmosphere is cooled, preferably while scrubbing out particulates, compressed, and then purified by passage through a bed comprising water selective and hydrogen sulfide selective adsorbents.

8 Claims, 1 Drawing Sheet

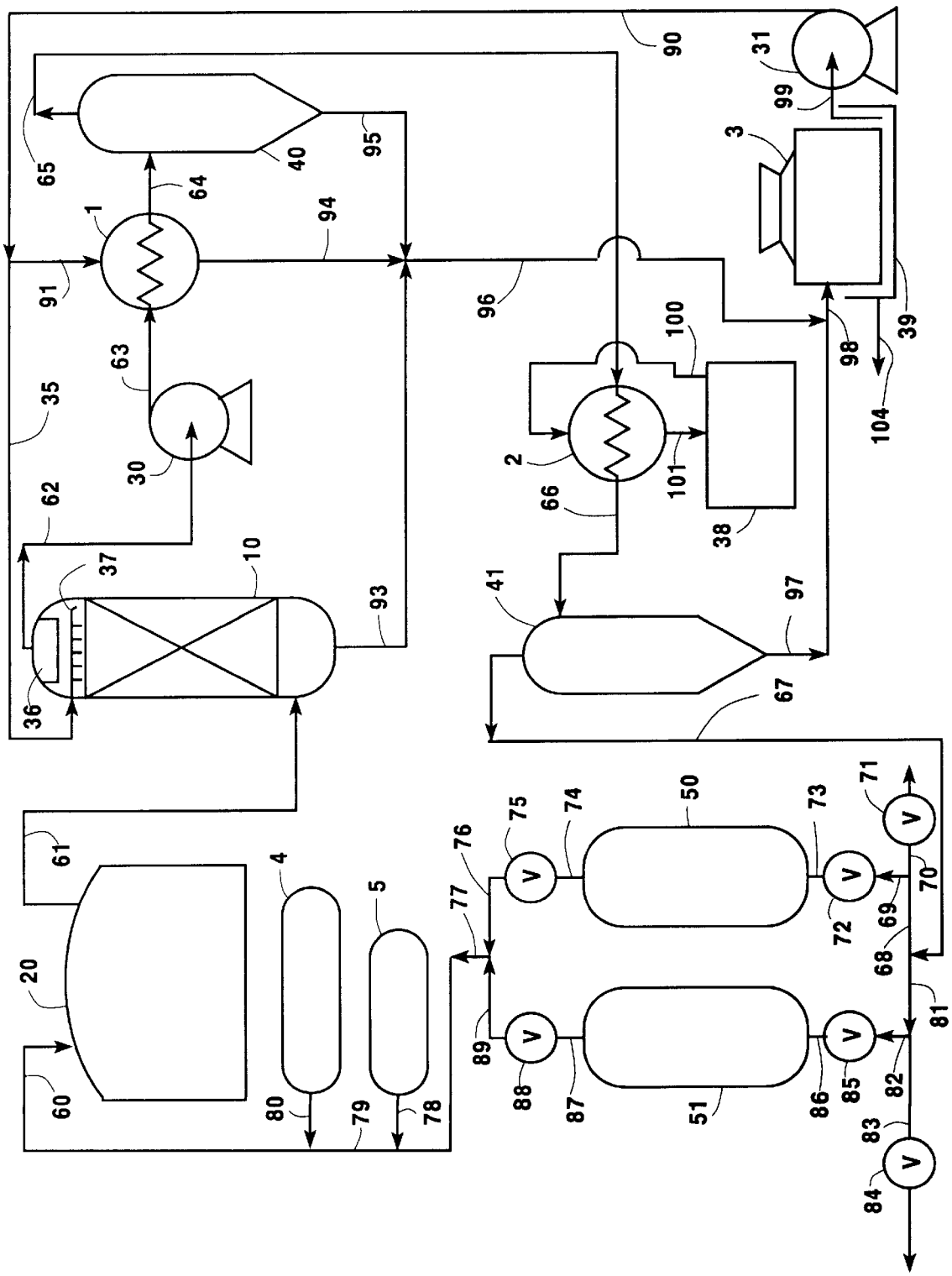

GAS RECYCLE FOR FLOAT GLASS SYSTEM

TECHNICAL FIELD

This invention relates generally to float glass manufacturing and, more particularly, to the protective atmosphere employed in float glass manufacturing.

BACKGROUND ART

The production of flat sheet glass by the float glass process involves the pouring of molten glass onto a bath of molten tin within a float glass furnace. To prevent the surface of the hot tin from oxidizing, an atmosphere of nitrogen is used in the float glass furnace. The atmosphere also contains hydrogen which reacts with any oxygen which is present to form water vapor, and with sulfur generated from the glass to form hydrogen sulfide. This further ensures the integrity of the hot tin and the molten glass within the furnace. Some stannous sulfide and stannous oxide may be produced which volatize and may condense on the roof of the furnace.

The protective atmosphere within the float glass furnace will become contaminated and will no longer be effective. To overcome this problem, it is conventional practice in the float glass industry to purge the float glass furnace of the contaminated protective atmosphere and replace it with a clean atmosphere of nitrogen and hydrogen. The purge may be intermittent or continuous. A continuous purge, although more costly, is preferred because it enables the production of better quality glass.

The purge of the contaminated protective atmosphere from a float glass furnace and its replacement with a new atmosphere is costly.

Accordingly, it is an object of this invention to provide a system which will reduce the costs of manufacturing glass using the float glass method while not compromising the quality of the manufactured glass.

SUMMARY OF THE INVENTION

The above and other objects, which will become apparent to those skilled in the art upon a reading of this disclosure, are attained by the present invention which is:

A method for cleaning and recycling protective atmosphere for a float glass facility comprising:

(A) withdrawing a contaminated protective atmosphere fluid from a float glass facility, said fluid comprising nitrogen, hydrogen, water vapor and hydrogen sulfide;

(B) cooling said fluid to produce a cooled fluid;

(C) compressing the cooled fluid to produce a compressed fluid;

(D) passing the compressed fluid through a bed of adsorbent particles and adsorbing water vapor and hydrogen sulfide from the compressed fluid onto the bed to produce a cleaned fluid; and (E) passing the cleaned fluid to the float glass facility.

As used herein the term "bed" means a collection of adsorbent particles in close proximity to each other and configured such that it is able to be contacted by a fluid.

As used herein the term "indirect heat exchange" means the bringing of two fluids into heat exchange relation without any physical contact or intermixing of the fluids with each other.

As used herein the term "direct heat exchange" means the bringing of two fluids into heat exchange relation with physical contact or intermixing of the fluids with each other.

As used herein the term "pressure swing adsorption unit" means a system for carrying out a separation process comprising the principal steps of adsorption, during which species in a mixture are preferentially adsorbed onto adsorbent, and regeneration or desorption, wherein the preferentially adsorbed species are removed from the adsorbent by a reduction in the pressure.

As used herein the term "water selective adsorbent" means a material that preferentially adsorbs water vapor from a mixture which comprises water vapor and other component(s).

As used herein the term "hydrogen sulfide selective adsorbent" means a material that preferentially adsorbs hydrogen sulfide from a mixture which comprises hydrogen sulfide and other component(s).

BRIEF DESCRIPTION OF THE DRAWING

The sole FIGURE is a schematic representation of one preferred embodiment of a system which may be used to practice the present invention.

DETAILED DESCRIPTION

The invention will be described in detail with reference to the Figure. Referring now to the Figure, a stream of contaminated protective atmosphere fluid 61 is withdrawn from float glass facility or furnace 20. The contaminated protective atmosphere fluid 61 comprises nitrogen, hydrogen, water vapor and hydrogen sulfide. Contaminated protective atmosphere fluid 61 may also contain particulate matter such as liquid droplets of stannous sulfide and stannous oxide. Generally fluid 61 will have a nitrogen concentration up to 95 mole percent, a hydrogen concentration within the range of from 3 to 95 mole percent, a water vapor concentration up to 10 mole percent, and a hydrogen sulfide concentration up to 1 mole percent.

Fluid 61 has a temperature generally within the range of from 1400 to 2000° F. Hot fluid 61 is cooled to a lower temperature to enable efficient further processing of this fluid. Any effective method to cool fluid 61 may be used in the method of this invention. The Figure illustrates a particularly preferred method for cooling fluid 61 wherein fluid 61 is cooled by direct heat exchange with water wherein fluid 61 rises against descending water. In this way particulate matter such as stannous sulfide and/or stannous oxide is scrubbed out of the rising fluid.

Referring back to the Figure, contaminated protective atmosphere fluid 61 is passed into the lower portion of quench vessel 10 and quench water 35 is passed into the upper portion of quench vessel 10. Fluid 61 rises in direct contact with descending quench water 35 within quench vessel 10 and in the process fluid 61 is cooled and particulate matter is scrubbed from rising fluid 61 into the descending quench water. The warmed quench water passes out of quench vessel 10 in stream 93 and is passed as stream 96 and 98 into cooling tower 3. The resulting cooled fluid passes through demister pad 36 which is located above quench water distributor 37 within quench vessel 10 to remove any liquid water which may be in the cooled fluid, and is then withdrawn from quench vessel 10 as cooled fluid 62.

Cooled fluid 62 has a temperature generally within the range of from 60 to 100° F. and is compressed to a pressure generally within the range of from 50 to 100 pounds per square inch absolute (psia). In the embodiment illustrated in the Figure, cooled fluid 62 is compressed by passage through centrifugal compressor 30 and resulting compressed fluid 63 is cooled of the heat of compression by passage through aftercooler 1 by indirect heat exchange with cooling water 91. Resulting heated water is withdrawn from aftercooler 1 as stream 94 and passed in stream 96 and 98 into cooling tower 3. The cooling in aftercooler 1 causes some of the water vapor within compressed fluid 63 to condense. The resulting two phase fluid is passed from aftercooler 1 in stream 64 to separator 40 wherein the liquid water is separated from the two phase fluid, withdrawn from separator 40 in stream 95 and passed in stream 96 and 98 into cooling tower 3.

Compressed fluid is passed out of separator 40 in stream 65 and further cooled to a temperature generally within the range of from 45 to 60° F. in chiller heat exchanger 2 by indirect heat exchange with cooling water 100. The spent cooling water is withdrawn from chiller heat exchanger 2 in stream 101 and passed into chiller basin 38. The cooling in chiller heat exchanger 2 causes some of the water vapor within compressed fluid 65 to condense. The resulting two phase fluid is passed from chiller heat exchanger 2 in stream 66 to separator 41 wherein the liquid water is separated from the two phase fluid, withdrawn from separator 41 in stream 97 and passed in stream 98 into cooling tower 3.

In cooling tower 3 the water delivered in stream 98 is cooled as it descends and the cooled water falls into cooling tower basin 39. Particulate matter is passed out of the cooling water within basin 39 in stream 104. The cooling water within basin 39 is withdrawn in stream 99 by operation of pump 31 and passed out of pump 31 in cooling water stream 90 which is recycled to aftercooler 1 in stream 91 and to quench vessel 10 as stream 35.

Chilled compressed fluid is withdrawn from separator 41 in stream 67 and passed through a bed of adsorbent particles comprising water selective adsorbent and hydrogen sulfide selective adsorbent, preferably in one or more layers of each. As the compressed fluid is passed through this bed, water vapor and hydrogen sulfide are adsorbed from the compressed fluid onto the bed producing cleaned fluid for recycle to the float glass facility. The preferred water selective adsorbent is aluminum oxide or alumina. Other water selective adsorbents which may be employed in the practice of this invention include 3X molecular sieve, 4A molecular sieve and 13X molecular sieve. The preferred hydrogen sulfide selective adsorbent is 5A molecular sieve. Other hydrogen sulfide selective adsorbents which may be used in the practice of this invention include activated alumina such as Selexsorb COS available from Alcoa Industrial Chemicals and A204 available from LaRoche Industries Inc. Those skilled in the art of adsorbents are familiar with the terms used above and with their meanings.

The embodiment of the invention illustrated in the Figure employs a pressure swing adsorbent (PSA) unit employing two adsorbent beds in PSA vessels 50 and 51 respectively. The two PSA vessels operate alternately. One vessel is operating under pressure on the adsorption cycle while the other is being regenerated at reduced pressure. Assuming that the cycle is such that PSA vessel 50 is on the adsorption cycle, the compressed fluid 67 from separator 41 is directed through piping 68, branch 69, reversing valve 72, and piping 73, into PSA vessel 50. Here the moisture and the hydrogen sulfide are removed to an extremely low level by adsorption onto the bed within vessel 50. The cleaned fluid leaves PSA vessel 50 by way of piping 74, check valve 75, piping 76, and piping 77. At the same time the bed within PSA vessel 51 is undergoing regeneration. The fluid in PSA vessel 51, initially under operating pressure at the end of the cycle, is blown down to the atmosphere through piping 86, automatic valve 85, piping 82 and 83, and automatic valve 84. The reduction to essentially atmospheric pressure releases the adsorbed moisture and hydrogen sulfide. A purge of the bed completes the cycle and the bed is then ready for the next adsorption cycle. At this point all the contaminants have been removed from stream 77 and thus it can be reintroduced into float glass forming chamber 20. When PSA vessel 51 is on the adsorption cycle, the compressed fluid 67 from separator 41 is directed through piping 81 and 82, reversing valve 85 and piping 86 into PSA vessel 51. The cleaned fluid leaves PSA vessel 51 by way of piping 87, check valve 88, piping 89 and piping 77. The fluid in PSA vessel 50 is blown down to the atmosphere through piping 73, reversing valve 72, piping 69 and 70, and automatic valve 71.

The major source of loss of protective atmosphere from the float glass forming chamber is the door through which the hot solidified glass sheet is withdrawn. A purge of the protective atmosphere in the chamber surrounding the exiting hot glass sheet is necessary to keep air from entering the chamber through the door. This loss is replaced by adding fresh make-up nitrogen and hydrogen to the purified recycle stream. An additional amount of make-up nitrogen and hydrogen is required to replace the small amount lost in compressor seal leakage, and PSA blow-down. This is shown in the Figure by nitrogen supply 4 and hydrogen supply 5 and the accompanying piping 78, 79, and 80 which feeds into the recycle stream to form stream 60 which is passed to the float glass facility 20. Typically the new nitrogen and hydrogen passed into the recycle stream amount to about from 10 to 20 percent of the protective atmosphere of the float glass facility so that in the practice of this invention from about 80 to 90 percent of the protective atmosphere is cleaned and recycled back to the float glass facility.

Table 1 lists the results of one example of this invention carried out in accord with the system illustrated in the Figure. The stream numbers listed in Table 1 correspond to those of the Figure. This example of the invention is presented for illustrative purposes and is not intended to be limiting.

TABLE 1

| Stream No. | Flow Cfh, NTP | Temp. F. | Press. Psia | $N_2$ | Composition $H_2$ | Mole Percent $H_2O$ | $H_2S$ |
|---|---|---|---|---|---|---|---|
| 60 | 50,000 | 70 | 14.7 | 90.0 | 10.0 | 0 | 0 |
| 61 | 45,000 | 1400 | 14.7 | 86.5 | 9.4 | 4.0 | 0.10 |
| 102 | 5,000 | 1050 | 14.7 | 86.5 | 9.4 | 4.0 | 0.10 |
| 62 | 44,787 | 80 | 14.2 | 86.9 | 9.5 | 3.5 | 0.10 |
| 103 | 112 | 250 | 73.0 | 86.9 | 9.5 | 3.5 | 0.10 |
| 65 | 43,410 | 80 | 72.5 | 89.5 | 9.7 | 0.7 | 0.10 |
| 67 | 43,204 | 50 | 72.0 | 89.4 | 9.8 | 0.7 | 0.10 |
| 77 | 42,339 | 70 | 72.0 | 90.0 | 10.0 | 0.0 | 0.0 |
| 84 | 865 | 70 | 14.7 | 80.8 | 1.0 | 13.0 | 0.10 |
| 78 | 789 | 70 | 14.7 | | 100 | | |
| 80 | 6,871 | 70 | 14.7 | 100.0 | | | |

Now, by the use of this invention, float glass may be manufactured more efficiently with lower costs. Moreover, with the continuous removal of stannous sulfide and stannous oxide impurities from the float glass facility, an improvement in the quality of the manufactured float glass may also be attained.

Although the invention has been discussed in detail with reference to a certain preferred embodiment, those skilled in the art will recognize that there are other embodiments of the invention within the spirit and the scope of the claims.

We claim:

1. A method for cleaning and recycling protective atmosphere for a float glass facility comprising:
   (A) withdrawing a contaminated protective atmosphere fluid from a float glass facility, said fluid comprising up to 95 mole percent nitrogen, from 3 to 95 mole percent hydrogen, up to 10 mole percent water vapor and up to 1 mole percent hydrogen sulfide;
   (B) cooling said fluid to produce a cooled fluid having a temperature generally within the range of from 60 to 100° F.;
   (C) compressing the cooled fluid to a pressure generally within the range of from 50 to 100 pounds per square inch absolute to produce a compressed fluid, cooling the compressed fluid and condensing some of the water vapor in the compressed fluid to produce liquid water, and separating said liquid water from the compressed fluid;
   (D) further cooling the compressed fluid to a temperature generally within the range of from 45 to 60° F. and condensing some of the remaining water vapor in the compressed fluid to produce additional liquid water, and separating said additional liquid water from the compressed fluid, and thereafter passing the compressed fluid through a bed of adsorbent particles within a vessel and adsorbing water vapor and hydrogen sulfide from the compressed fluid onto the bed to produce a cleaned fluid; and
   (E) passing the cleaned fluid to the float glass facility.

2. The method of claim 1 wherein the contaminated protective atmosphere fluid further comprises at least one of stannous sulfide and stannous oxide.

3. The method of claim 2 wherein the cooling of the contaminated protective atmosphere fluid is carried out by directly contacting the contaminated protective atmosphere fluid with descending quench water.

4. The method of claim 3 further comprising cooling the quench water after the direct contact with contaminated protective atmosphere fluid and recycling the cooled quench water for further direct contact cooling of contaminated protective atmosphere fluid.

5. The method of claim 1 wherein the further cooling of the compressed fluid causes some water vapor within the contaminated protective atmosphere fluid to condense to form liquid water, further comprising cooling the said liquid water and using the resulting cooled liquid water to carry out the said further cooling by indirect heat exchange with the compressed fluid.

6. The method of claim 1 wherein the bed of adsorbent particles comprises at least one layer of water selective adsorbent and at least one layer of hydrogen sulfide selective adsorbent.

7. The method of claim 6 wherein the water selective adsorbent comprises alumina and the hydrogen sulfide selective adsorbent comprises 5A molecular sieve.

8. The method of claim 1 wherein the bed of adsorbent particles is part of a pressure swing adsorption unit.

* * * * *